June 30, 1942.  H. W. ALTORFER  2,287,927
AUTOMATIC WASHING MACHINE
Filed Nov. 23, 1938   13 Sheets-Sheet 1
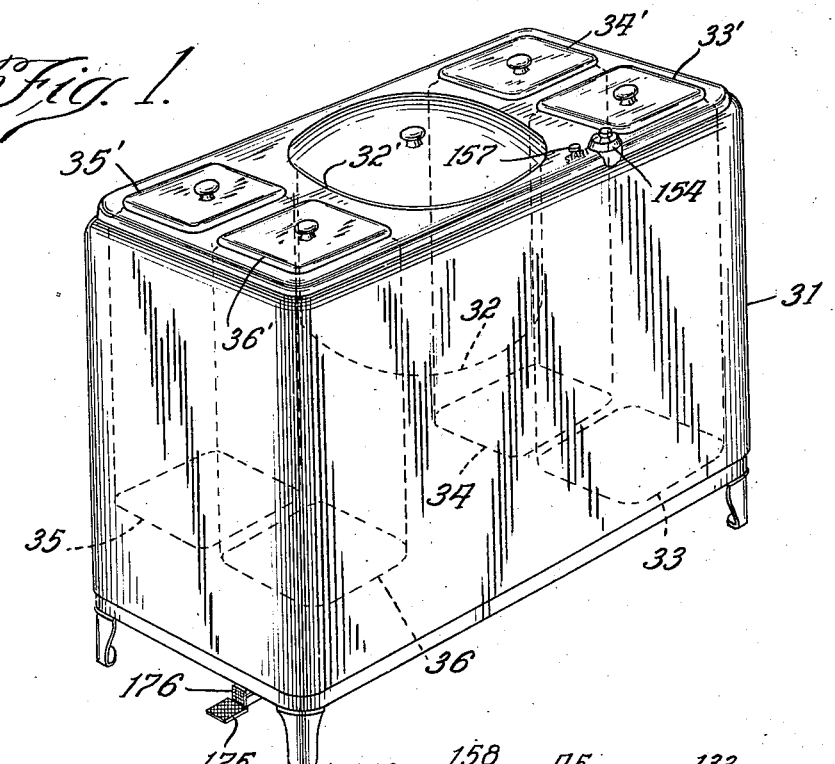
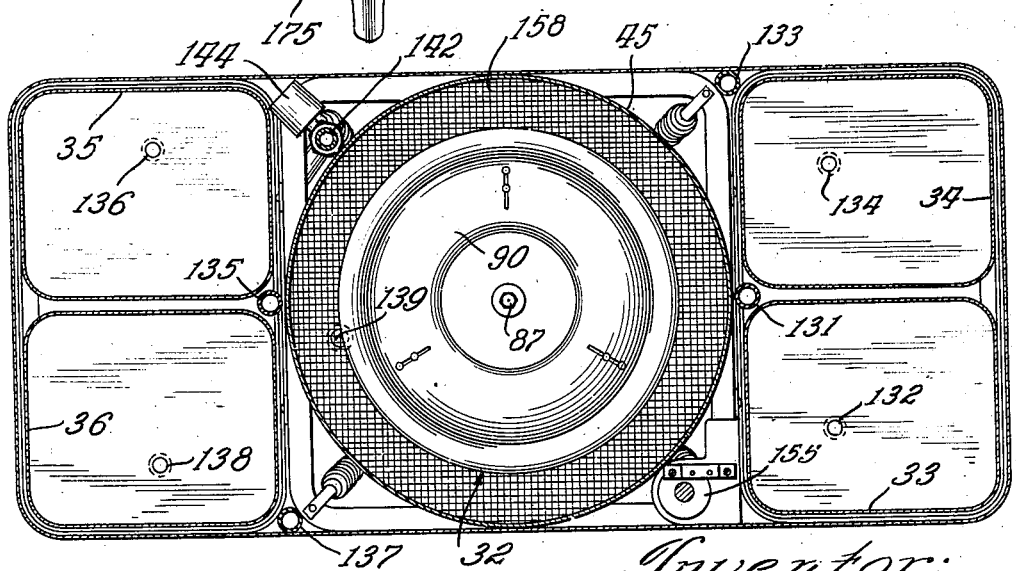
Inventor: Henry W. Altorfer
By: Tefft & Tefft
Attys.

June 30, 1942. H. W. ALTORFER 2,287,927
AUTOMATIC WASHING MACHINE
Filed Nov. 23, 1938 13 Sheets-Sheet 2

Inventor:
Henry W. Altorfer
By: Tefft & Tefft
Att'ys.

June 30, 1942. H. W. ALTORFER 2,287,927
AUTOMATIC WASHING MACHINE
Filed Nov. 23, 1938 13 Sheets-Sheet 4

Inventor:
Henry W. Altorfer
By: Tefft + Tefft
Att'ys.

June 30, 1942. H. W. ALTORFER 2,287,927
AUTOMATIC WASHING MACHINE
Filed Nov. 23, 1938   13 Sheets-Sheet 5

Inventor:
Henry W. Altorfer
By:- Tefft & Tefft
Att'ys.

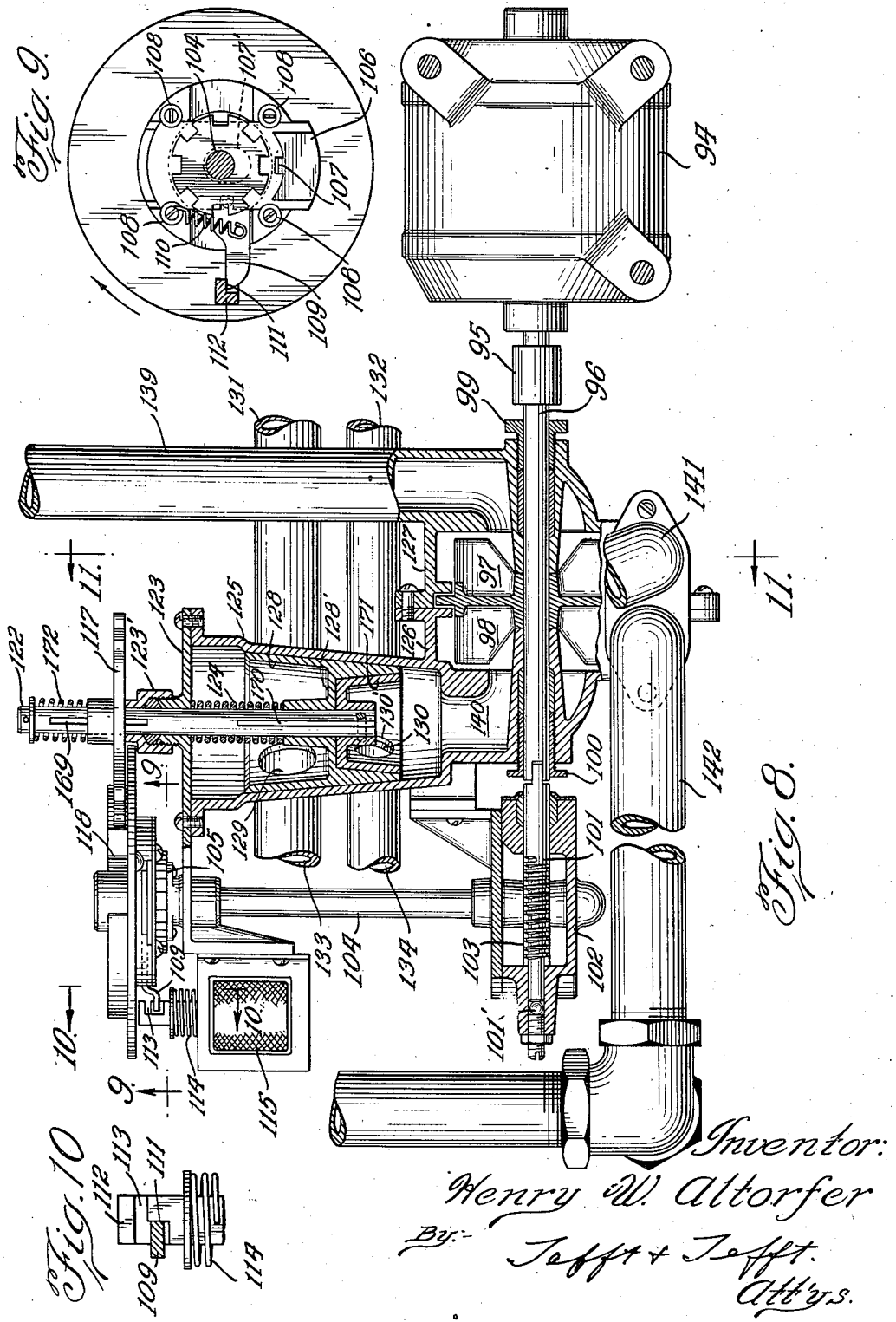

June 30, 1942.   H. W. ALTORFER   2,287,927
AUTOMATIC WASHING MACHINE
Filed Nov. 23, 1938   13 Sheets-Sheet 8

Inventor:
Henry W. Altorfer
By:- Tefft & Tefft.
Att'ys

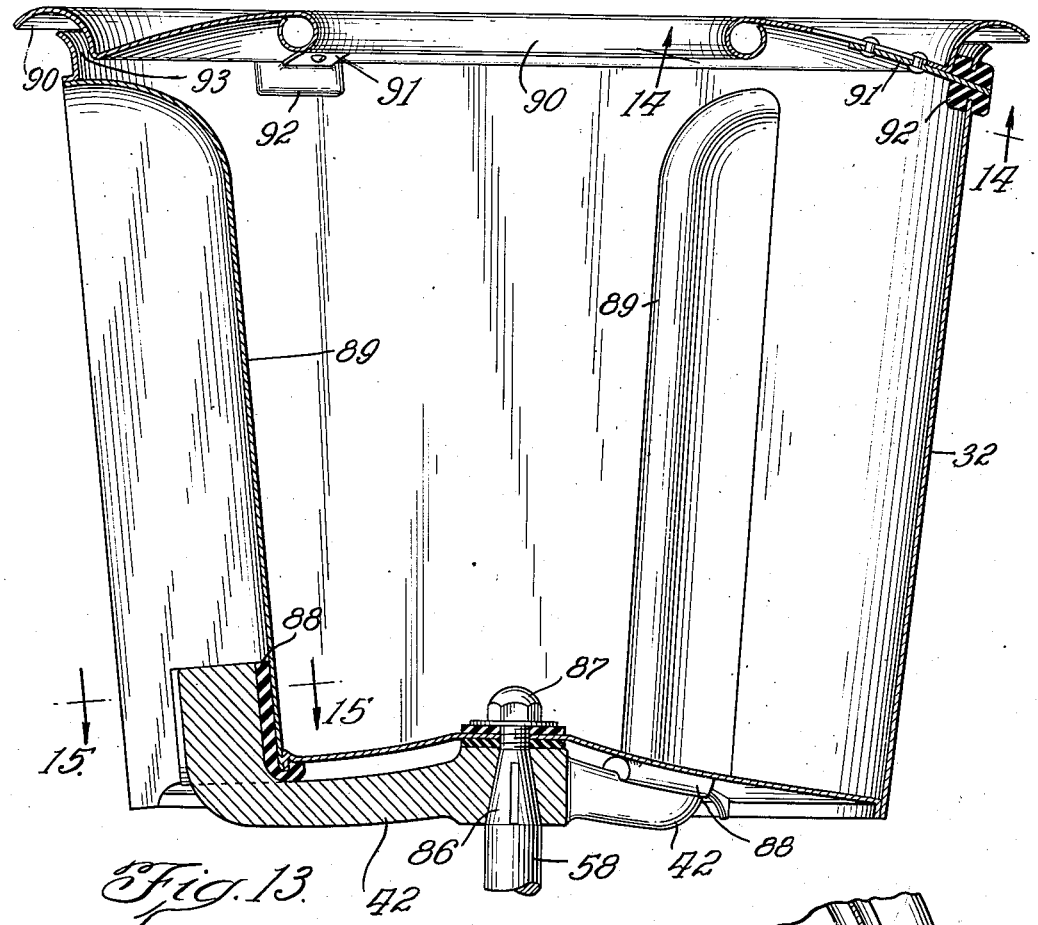
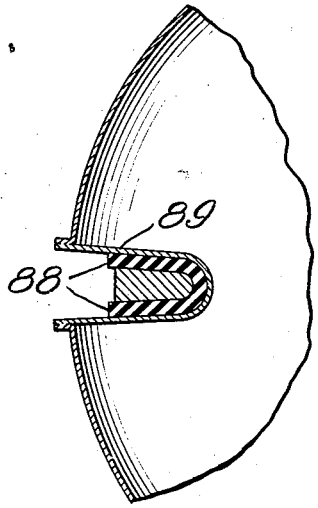
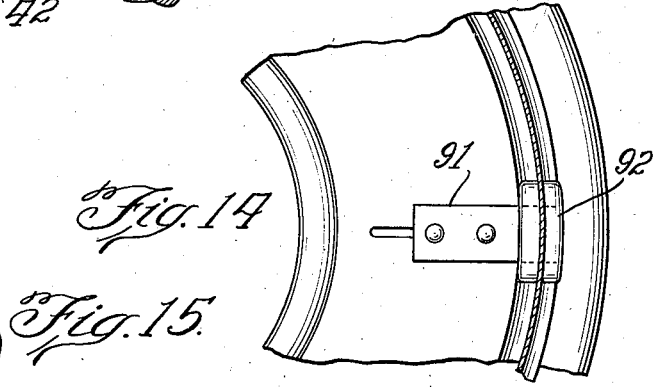

June 30, 1942.    H. W. ALTORFER    2,287,927
AUTOMATIC WASHING MACHINE
Filed Nov. 23, 1938    13 Sheets-Sheet 10

Inventor:
Henry W. Altorfer
By:- Tefft & Tefft
Attys.

June 30, 1942. H. W. ALTORFER 2,287,927
AUTOMATIC WASHING MACHINE
Filed Nov. 23, 1938 13 Sheets-Sheet 11
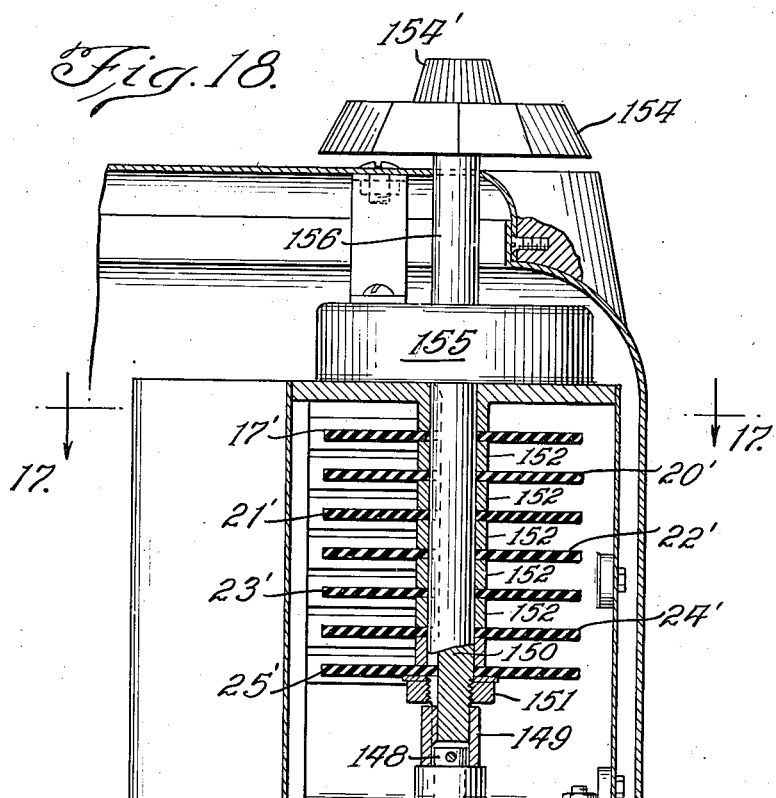
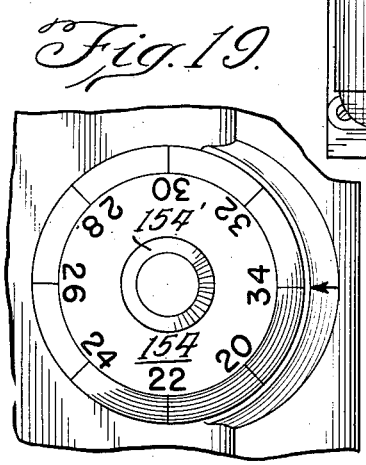
Inventor:
Henry W. Altorfer
By:- Tefft & Tefft
Att'ys.

June 30, 1942.  H. W. ALTORFER  2,287,927
AUTOMATIC WASHING MACHINE
Filed Nov. 23, 1938  13 Sheets-Sheet 12

Inventor:
Henry W. Altorfer.
By:- Tefft & Tefft.
Att'ys

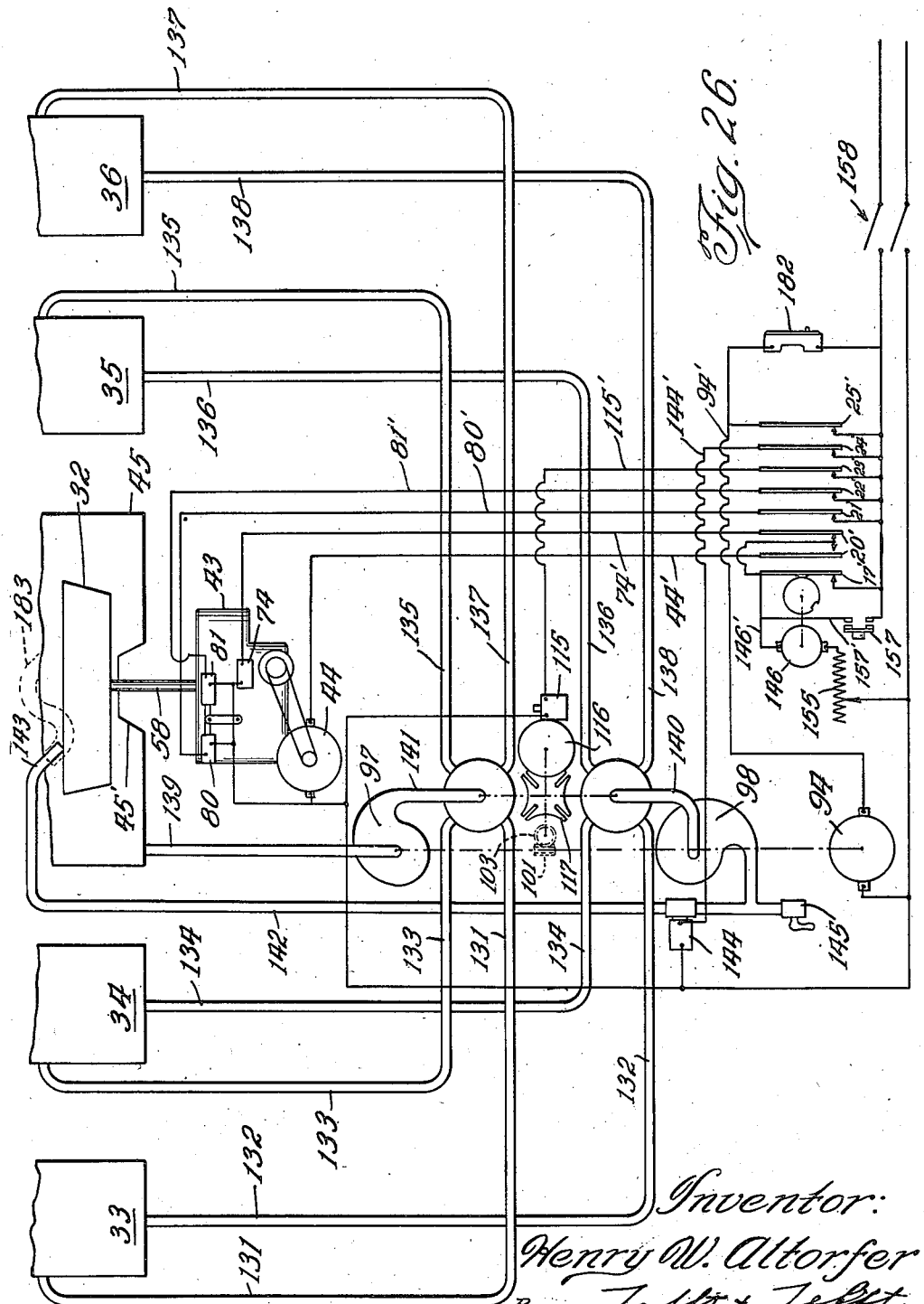

Patented June 30, 1942

2,287,927

UNITED STATES PATENT OFFICE 2,287,927

AUTOMATIC WASHING MACHINE

Henry W. Altorfer, Peoria, Ill.

Application November 23, 1938, Serial No. 241,901

5 Claims. (Cl. 68—148)

This invention relates to washing machines of the automatic cycle type wherein the several washing, rinsing and drying operations are performed in proper sequence automatically.

The present form of the invention is as a domestic washing machine, but it will be obvious that the invention may be applied in various other types of machines, and it will be understood that the applicant is merely describing a preferred embodiment of his invention.

Domestic washing machines generally have been developed to a high state of perfection over an extensive period of years, as manually operable washer units having a swinging wringer attached thereto. Such machines are usually located in basements adjacent rinse tubs, water faucets and floor drains and their use involves almost the continuous presence of the operator for the multiplicity of operations involved in the task of home laundering. Moreover, their operation usually incurs considerable incidental immersion of the operator's hands in the various tubs of water, which with the accidental spilling of water, etc., generally makes washing a damp, messy task. Moreover, these conventional type washers have many faults which are generally recognized, such as:

a. Too small a volume of water for the quantity of clothes washed, a condition which contributes to poor, high-bacteria washing results.

b. Too small a volume of rinse water, usually of improper temperature and often the wrong kind of rinse, which with improper flushing of the garments in the rinse water, usually results in the improper rinsing of the clothes.

c. Ineffective, destructive and dangerous wringing of the clothes with conventional roll wringers.

All of these points have been given careful and thoughtful consideration by the applicant in the development of this invention, and later it will be explained how these objections have been eliminated in this device.

Applicant is aware that there are automatic or semiautomatic machines of this general type on the market and has given these machines careful study and consideration. These machines generally fail to give the desired results for one or more of the following reasons:

a. Ineffective washing action.

b. Ineffective wringing.

c. Small volume of wash and rinse water.

d. Wasteful use of soap, bluing, water and heat.

e. Expensive plumbing for installation.

f. Large hot water supply requirements.

g. Vibration incident to the extractor operation.

h. The complete washing cycle requires too much time, slow.

i. Unsanitary. Interior of the machine cannot be completely cleaned.

Later the applicant will explain how these objections have been largely eliminated by the present invention.

With full consideration and appreciation of the foregoing, the particular object of this invention is to provide a complete self-contained washing machine which will automatically perform the full cycle of necessary power washing, power rinsing and centrifugal drying operations rapidly, effectively and quietly.

Another object is to provide in a machine of this character means whereby a fully adequate supply of wash and rinse water is provided which can be properly heated, treated and used without waste for the complete normal domestic wash of about 25 lbs. dry weight, which is usually sorted into four or five batches of clothes.

Another object is to provide means whereby the full and adequate supply of wash and rinse water for the entire washing may be circulated through each batch of clothes and in the tub while it is in operation so as to make the washing and rinsing operations more effective.

And a still further object is to provide means and structure in a machine of the class described whereby the tub and tanks of the machine may be manually scrubbed and cleansed to make the machine clean and sanitary.

Fig. 1 is a general isometric view of the washer showing the tub and tanks in dotted outline;

Fig. 2 is a top sectional plan view of the washer with the cabinet top removed to show the tanks;

Figure 3:
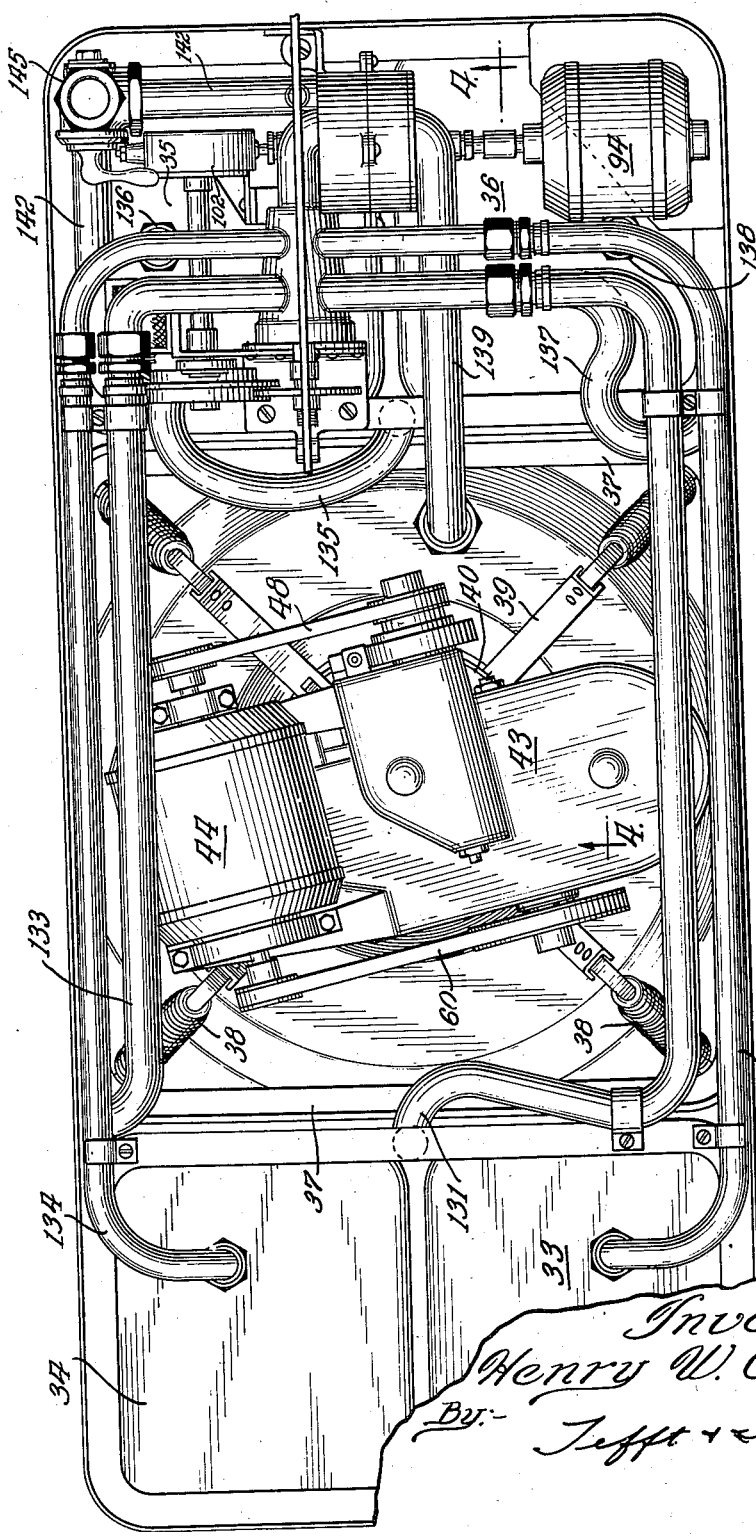
Fig. 3 is an enlarged bottom plan view showing the arrangement of the mechanism and the piping to the tanks.
Figure 4:
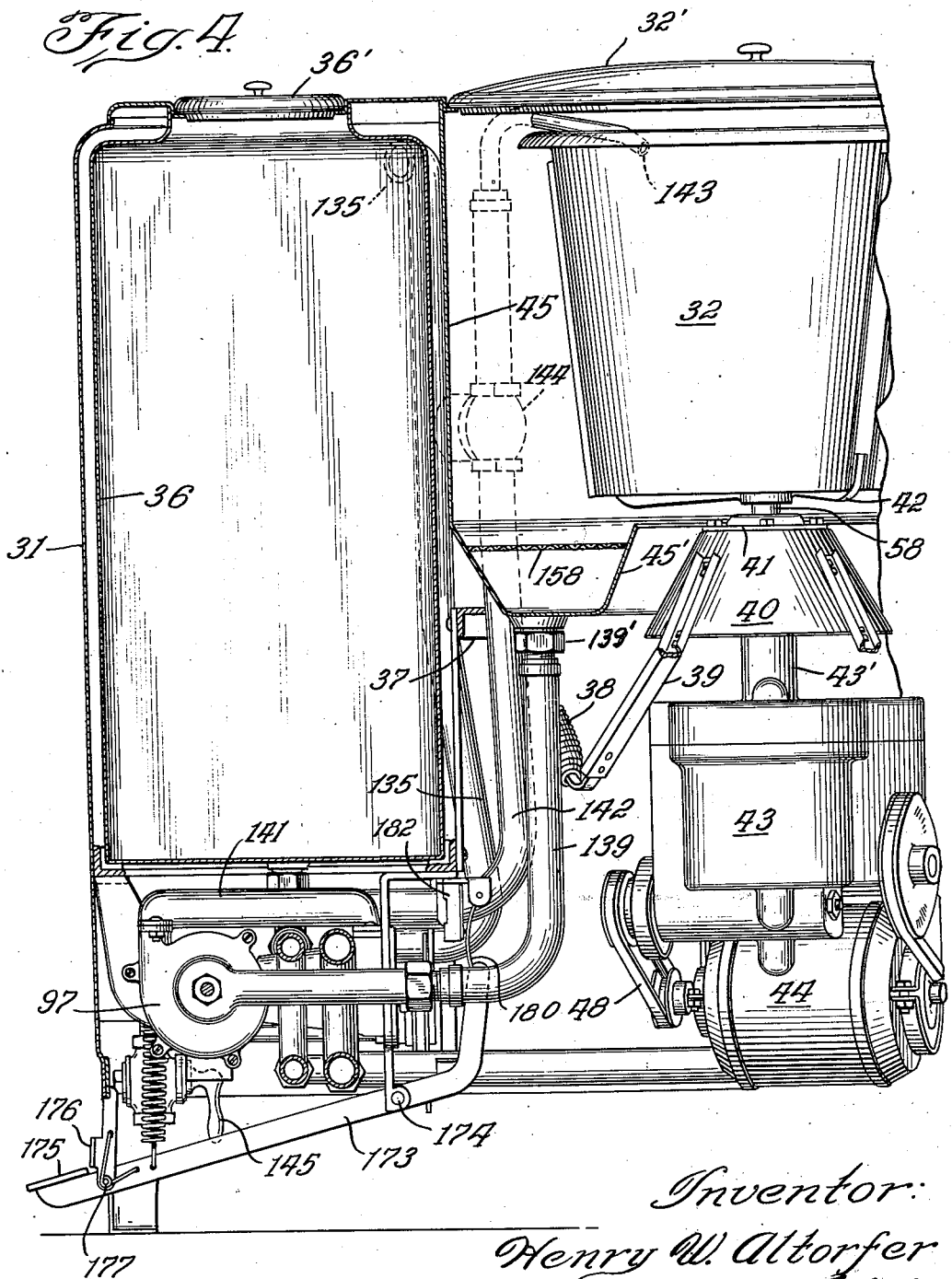
Fig. 4 is an enlarged broken elevation view partly in section, showing the arrangement of the mechanism, the distribution and tanks.

Fig. 4ª is an enlarged sectional detail of a check valve, later explained.

Figure 5:
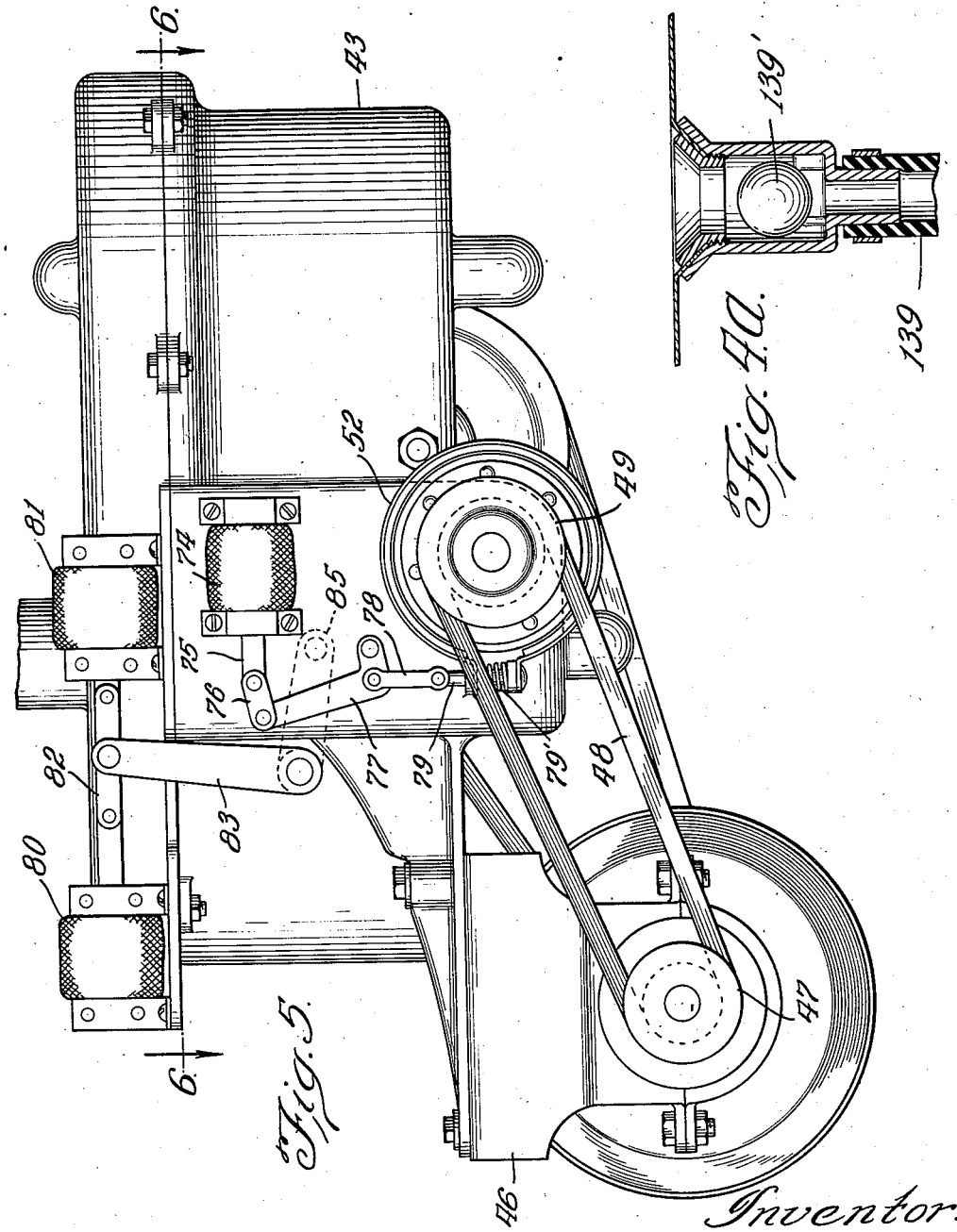
Figure 6:
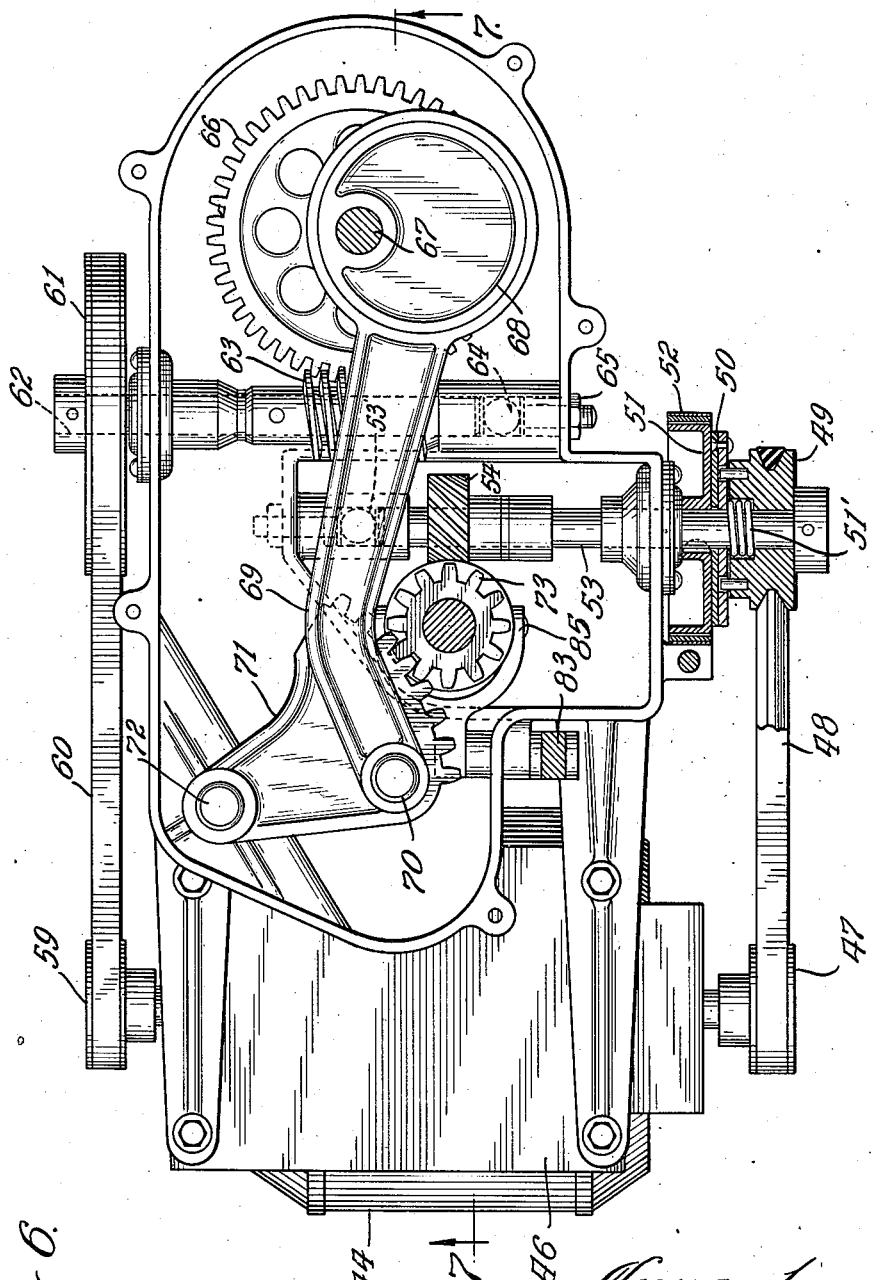

Fig. 5 is an enlarged side elevation view of the motor and gear case, showing the solenoid controls in position;

Fig. 6 is an enlarged plan view of the gear case as it appears on the section lines 6—6 of Fig. 5.

Figure 7:
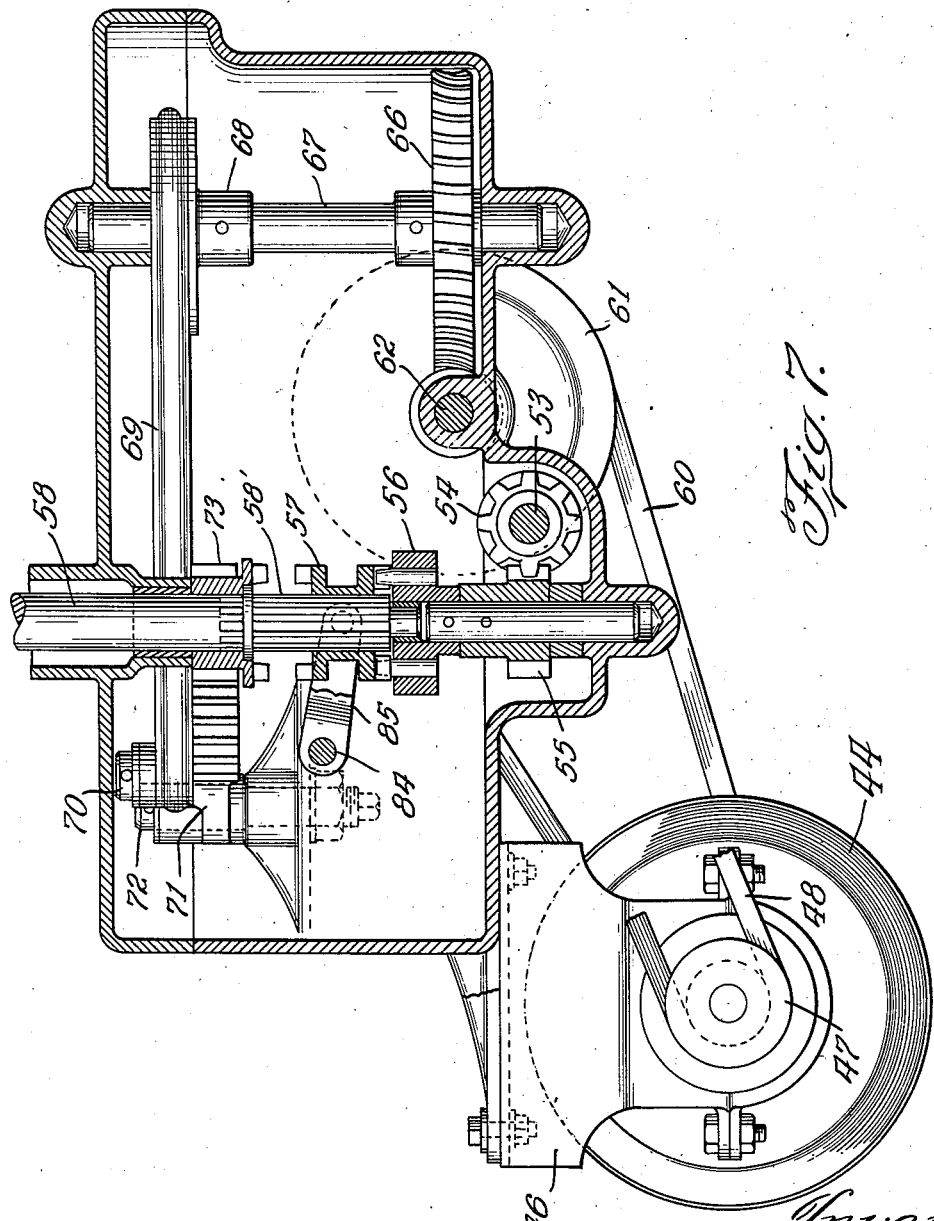
Figure 12:
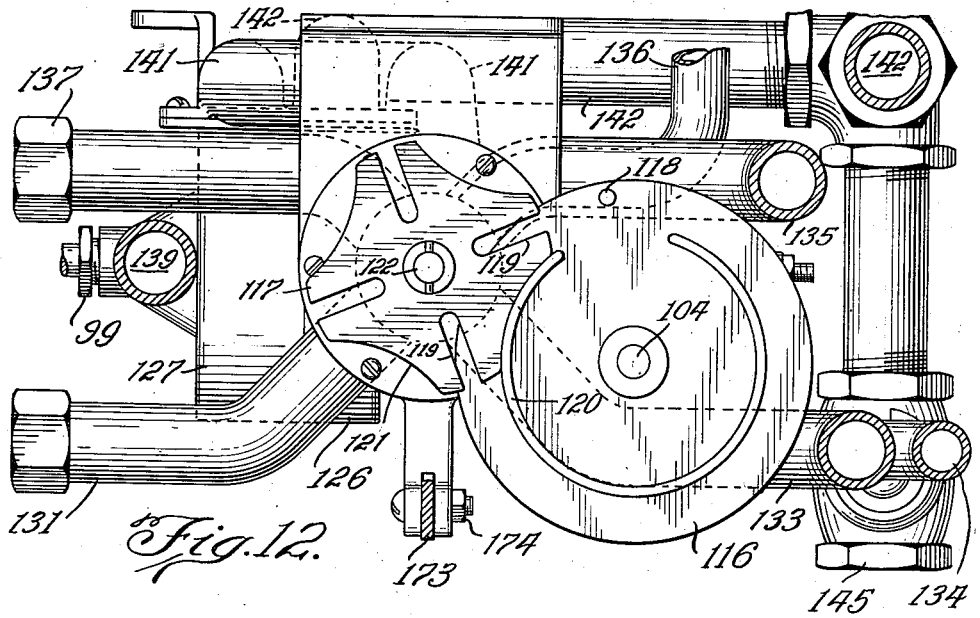
Figure 11:
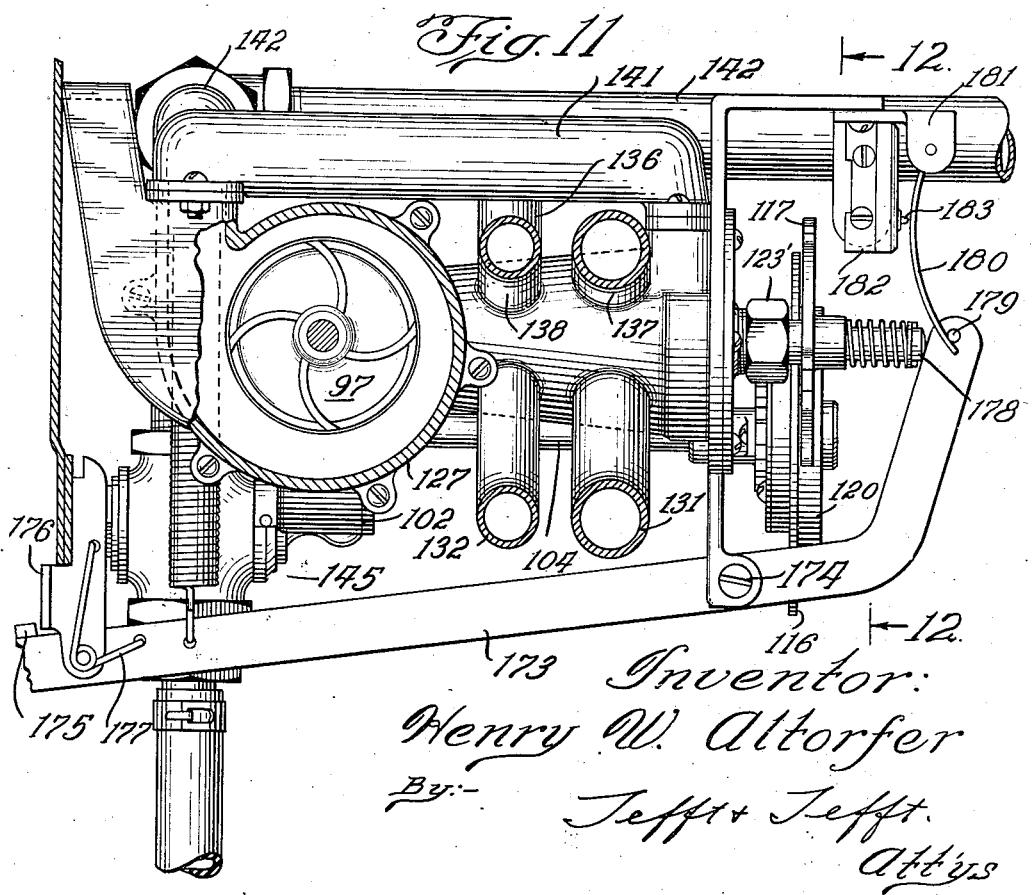
Figure 16:
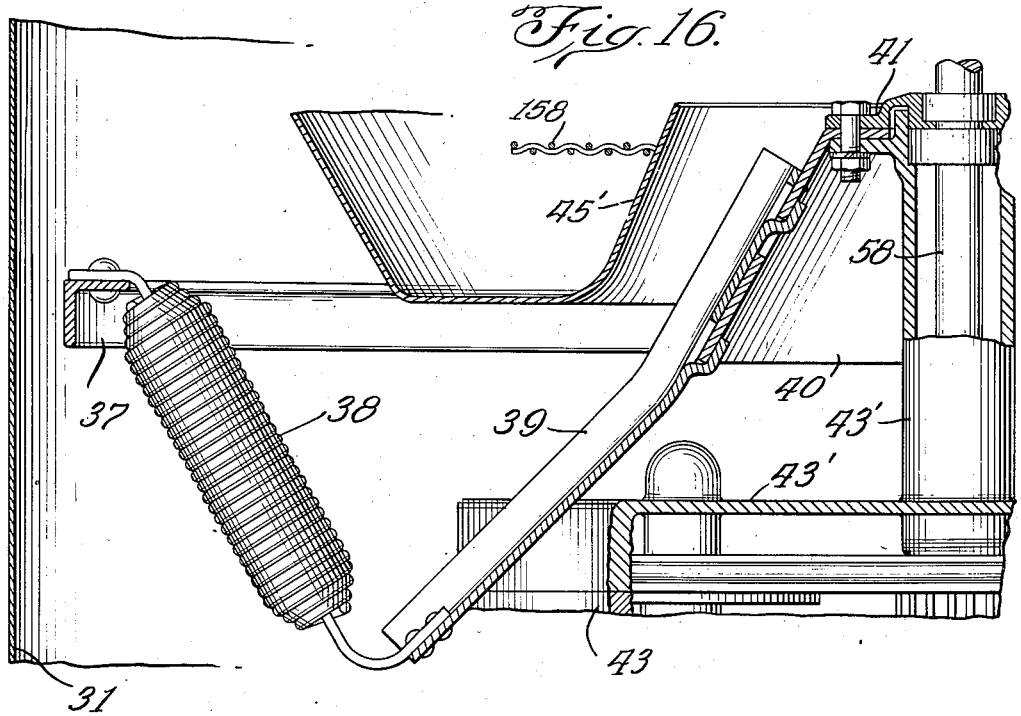
Figure 17:
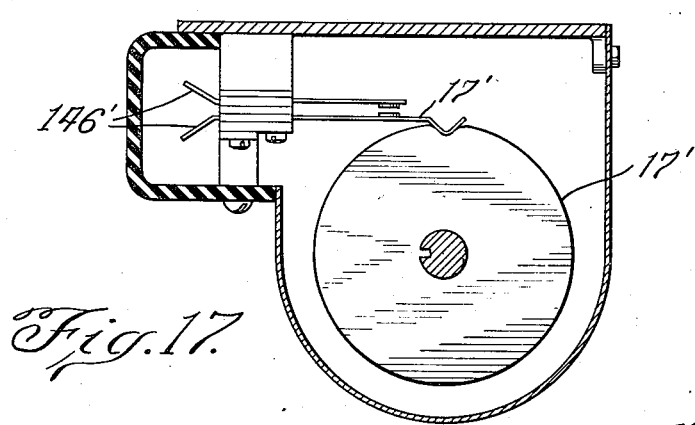

Fig. 7 is an enlarged sectional elevation view of the gear case, showing the interior mechanism as it appears on the section lines 7—7 of Fig. 6;

Fig. 8 is an enlarged plan view of the pump, pump motor and distributor valve partly in section to better show the arrangement;

Fig. 9 is a sectional plan view of the single revolution clutch used in the distributor system as it would appear on the section lines 9—9 of Fig. 8;

Fig. 10 is an enlarged elevation view of the solenoid escape plunger used in connection with the one revolution clutch as it would appear from the section lines 10—10 of Fig. 8;

Fig. 11 is an enlarged broken side elevation view of the pump and distributor system partly in section, as it appears from the lines 11—11 of Fig. 8;

Fig. 12 is an end elevation view of the same mechanism as shown in Figs. 8 and 11;

Fig. 13 is an enlarged sectional elevation view of the tub, tub cover and support spider;

Fig. 14 is a broken sectional plan view showing the mounting of the cover in the body of the tub as it appears on the lines 14—14 of Fig. 13;

Fig. 15 is a broken sectional plan view showing the mounting of the tub on the support spider as it appears on the section lines 15—15 of Fig. 13;

Fig. 16 is an enlarged broken elevation view partially in section, showing details of the spring support for the tub and mechanism;

Fig. 17 is a sectional plan view showing details of the cycle control mechanism as they would appear on the section lines 17—17 of Fig. 18;

Fig. 18 is an enlarged elevation view of the cycle control mechanism partly in section;

Fig. 19 is a plan view of the control knob showing the time markings;

Figs. 20 to 25 are plan views of the various control disks for the different cycles, which will later be described in detail;

Fig. 26 is a diagrammatic outline drawing to better show the various electrical and hydraulic controls which will later be described.

Fig. 1 shows a general view of the washer which is enclosed within a cabinet designated as a whole by the numeral 31. Centrally located in the cabinet, as indicated in dotted outline, is a vertical axis tub 32 enclosed within a casing, as will later be shown and described. All washing, rinsing and centrifugal drying operations are done in this tub and without attention from the operator, by means which will later be disclosed.

Enclosed within the cabinet, as shown in dotted outline, are four substantially rectangular tanks 33, 34, 35 and 36, each having a top opening lid 33', 34', 35' and 36'. The two tanks on one end are for wash water and, of course, with the top opening lids this wash water may be prepared by the addition of water softener and soap for the proper cleansing of clothes. Although not shown, it is obvious that heating means might be introduced to these tanks, for instance, as tubular electrical heating elements, and thus is provided means whereby the complete washing supply of proper wash water, both as to temperature and soap content, may be prepared.

The tanks in the opposite end are for rinse waters, the one normally being a moderately warm rinse and the other a cold rinse to which bluing has been added. Thus means is provided whereby the complete washing supply of proper rinse waters are available for use in the machine.

As shown in Figs. 1 and 2, the tanks or compartments 33, 34, 35 and 36 are symmetrically arranged in pairs on opposite sides of the washing tub 32, and extend downwardly in the cabinet 31 to points appreciably below the bottom of the tub 32. This arrangement and construction utilizes the weight of the water or fluid in the respective tanks or compartments to stabilize the cabinet and the entire unit especially during the centrifugal drying operation of the tub. Furthermore, the enlarged capacity of each of the tanks relative to the much reduced capacity of the tub, supplies the needed quantity of water for washing, while utilizing a minimum quantity of water in the tub at one time, which not only permits high speed rotation of the small tub for extraction without substantial vibration, but also insures rapid changing of the washing fluid or water during the washing action, with maximum sanitary effects.

The lids on the tanks being substantially as large as the tanks, enables the operator to thoroughly cleanse the interior of the tanks so as to keep them sanitary and clean. This is very important in a domestic washing machine and particularly in the type disclosed wherein the wash and rinse waters are circulated through the tub and clothes. As a matter of fact, this cleansing of the tanks is so important that a long handled brush is supplied to the operator so as to better enable her to keep the tanks sweet and clean.

Now referring to Fig. 4, which is a vertical sectional elevation view, attention is directed to the angle iron support rail 37 from which the entire tub mechanism is supported. This support rail extends completely around the central section of the cabinet and is riveted securely therein. Attached to this angle iron support 37 are coiled tension support springs 38, as is better shown in Fig. 16. The opposite ends of the springs 38 attach to channel members 39 which in turn attach to a central cone support member 40, as shown. On the top of this cone support member is an annular supporting bearing 41 which supports the main drive shaft 58 and the gear case cover 43', as best shown in Fig. 16. The gear case 43 hangs on the gear case cover 43' and is driven by a motor 44 attached to the gear case by brackets, as best shown in Fig. 7. On top of the main tub shaft 58 is a tub support spider 42 which supports the tub 32, as will later be described in detail. Around the tub 32 is a water receiver casing 45 which catches the water discharged from the tub 32, draining it off through the sump 45'. In the sump 45' is a screen 158 which will catch buttons, pins and other foreign matter. Also at the juncture of the sump 45' and the drain tube 139 is a hollow ball check valve as shown in Fig. 4ª which prevents water from the tanks backing up in sump 45'.

From the foregoing it will be understood that the tub and tub drive mechanism is yieldingly supported in the center of the cabinet by a unique spring support which is designed to eliminate vibration incident to the high rotational speeds of the tub during the extraction cycle.

Now referring to Figs. 5, 6 and 7 showing the gear case mechanism, it will be seen that the drive motor 44 is supported on the gear case 43 by conventional brackets 46. As will be seen in Fig. 6, the motor has a double shaft extension, and on one end of the shaft a pulley 47 drives a belt 48 to a drive pulley 49 loosely journaled on the spinner drive shaft 53. The pulley 49 transmits rotational movement to the spinner drive shaft 53 through a disk clutch 50 urged into contact with a brake pulley 51 by the friction clutch spring 51'. The brake pulley 51 is keyed to the shaft 53 and thereby imparts rotational movement to the shaft. On the spinner drive shaft 53 and attached thereto is a helical drive gear 54 which meshes with a mating helical gear 55 on the tub shaft 58, as clearly shown in Fig. 7. On the inner end of the spinner drive shaft 53 is a ball thrust bearing 53' which absorbs the thrust from the helical gears 54 and 55. It will be obvious that the spinner drive shaft 53 is rotated at all times. However, when the tub is clutched in for extraction, as will later be explained, the spinner drive friction clutch permits considerable slipping movement, thereby providing means whereby the tub is properly accelerated to its extraction speed.

Now referring to Fig. 7, it will be seen that a fixed clutch member 56 is attached to the tub shaft 58 above the driven helical gear 55 and a jaw clutch 57 is slidably mounted on splines 58' of the tub shaft 58 for clutching movement between the clutch member 56 for extractor rotation of the tub and the clutch pinion 73 which is for oscillating action of the tub, as will later be explained.

On the opposite end of the motor 44, as shown in Fig. 6, is another driven pulley 59 which drives a V-belt 60 to a driven pulley 61 fixedly mounted on the worm shaft 62. The worm shaft 62 is journaled in the gear case 43, driving a worm 63 fixed to the shaft. On the inside end of the worm shaft 62 is a ball thrust bearing 64 having an adjustment screw 65. The worm 63 meshes in and drives a worm gear 66 mounted on a vertical worm gear shaft 67, on the upper end of which is fixedly mounted an eccentric 68. This eccentric 68 through a connecting rod 69 attached by a pin 70 drives a segment gear 71 mounted on a pin 72. The segment gear 72 continuously oscillates the clutch pinion 73 which was mentioned in connection with the clutch 57.

From the foregoing it will be apparent that when the clutch 57 is in lowermost position, as shown in Fig. 7, the tub shaft 58 will be rapidly rotated, thus causing extractor or spinner action in the washer tub 32. When the clutch 57 is moved to upper position and meshes in the clutch pinion 73, the tub shaft will be oscillated, thereby causing oscillatory washing action in the tub 32.

Now referring to Fig. 5, a conventional solenoid 74 is mounted on the side of the gear case 43. The plunger of the solenoid 75 is connected by a pin 76 to a bell crank 77. It will be obvious that when the solenoid is energized to pull plunger 75 inward, the bell crank 77 will lift the link 78 and the bolt 79, which will clamp the brake 52 on the brake band 51 and thus stop rotation of the shaft 53 and the tub shaft 58 on which is mounted the tub 32. This action is permitted by means of the friction clutch 50. It will be obvious that the foregoing structure will permit the tub to be stopped. The spring 79' will cause the brake band 52 to be released when the solenoid 74 is de-energized.

Again referring to Fig. 5, on the gear case cover 43' there is mounted dual solenoids 80 and 81 connected by a link 82 pivotally attached to a bell crank lever 83 mounted on a pivot pin 84 which has a bell crank shift lever 85 mounted on its inner end, as shown in Fig. 7. It will be apparent that as the solenoid 80 is energized, the bell crank shift lever will be actuated upward to place the shift clutch 57 into engagement with the oscillating pinion 73, whereupon the tub will be oscillated. When the opposite solenoid 81 is energized, the shift lever will be actuated downward into clutch contact with the spinner clutch 56 and thereupon the tub will be accelerated rapidly into the spinning or extraction cycle. From the foregoing it will be apparent that means is provided to control the clutch 57 in order to effect either oscillating or rotating action of the tub.

Now referring to Figs. 13, 14, and 15, it will be seen that the tub support spider 42 is rigidly mounted on the tapered keyed end 86 of the shaft 58 and that the tub 32 is rigidly attached thereon by the crown nut 87. The tub support spider has three arms, the ends of which are surrounded by U-shaped grip rubbers 88, as clearly shown in Fig. 15. These grip rubbers fit securely into the hollow U-shaped tub baffles 89, as shown. It will be apparent that by this structure there is provided a firm yet cushioned mounting of the tub 32 on the spider 42.

The lid 90 of the tub 32 is mounted by means of lid brackets 91 having projections which extend through rubber lid grommets 92. The inside face of the grommets abut against the curved rim 90' and thus provide an annular discharge passage 93 for the water ejected by the centrifugal action of the tub when on the spinning cycle. The lid 90 has a rather large circular opening to facilitate putting in and taking out clothes as well as to permit easy access to the interior of the tub for all necessary scrubbing or cleansing. The lid being mounted in rubber grommets, as shown and described, is held in firm cushioned position without any metallic contact with the tub, a structure which is both effective and quiet. The curved rim 90' of the lid 90 throws the discharged water downward well within the receiver casing 45 where it is quickly drained off through the sump 45'.

From the foregoing it will be apparent that an effective tub structure is provided wherein clothes may be washed by the oscillatory movement of the tub and the water effectively extracted by the rapid rotation of the tub and centrifugal action.

Now referring to Fig. 8, a fractional horse power pump motor 94 is connected by a flexible coupling 95 to a stainless steel pump shaft 96 on which is mounted dual pump rotors 97 and 98. These rotors have separate and distinct housings and, therefore, for all practical purposes they are two distinct pumps, the purpose for which will later be described. The pump shaft 96 is sealed in the pump housing by pump packing glands 99 and 100.

On the outer end of the pump shaft 96 and attached to it by a tongue and groove connection is a worm shaft 101 mounted in a worm gear casing 102. The thrust of this worm shaft is taken by a conventional ball thrust bearing 101'. The worm 101 meshes into and drives a conventional worm gear 103 (not shown). This worm gear is mounted on a shaft 104 extending from the gear case 102, and on its upper end is mounted a drive clutch member 105.

Now referring to Fig. 9, it will be seen that this clutch is a rather conventional form of one revolution clutch wherein the member 105 is the drive clutch member and the sliding member 106 is the driven member. The slide clutch 106 slides between fixed washers 108 and has a tooth 107 for driving engagement in the openings of the clutch member 105. The slide member 106 is normally urged into clutching engagement by spring 110 and is permitted to slide between the washers 108 by a slotted opening 107' around the shaft 104. However, a throwout arm 109 projecting outward, as shown in Fig. 9, has come in contact with a solenoid plunger projection 111 mounted on the solenoid plunger 112, and by this contact the clutch 106 has slid outward out of engagement with clutch 105.

Now again referring to Figs. 8 and 10, it will be seen that the solenoid plunger 112 has a slotted opening 113 above the plunger projection 111, and when the plunger is pulled downward by energizing the solenoid 115 the throw-out arm is released through the escape opening 113, and the clutch 106 will, therefore, go one revolution until the throw-out arm 109 again strikes the plunger projection 111. This single revolution action of the clutch is provided for by means of the spring 114 on the solenoid plunger 112 which urges the plunger outward, as shown. It will, therefore, be apparent that when the solenoid 115 is energized momentarily, the plunger 112 will be drawn downward and then the spring 114 will immediately urge it outward to its position where the plunger projection 111 will again strike the throw-out arm 109.

From the above description it will be apparent that mechanism has been provided whereby a single revolution of the clutch 106 is obtained by momentarily energizing the solenoid 115.

Now referring to Figs. 12 and 8, journaled on top of the shaft 104 and driven by the slide clutch 106 is the drive plate 116 of a conventional Geneva motion mechanism consisting of the drive plate 116 and the driven plate 117. This type of mechanism is well-known in the art and will not be described any further than to explain that while the drive member is revolving one revolution, the driven member is driven a part of one revolution and in the meantime is held stationary. In the mechanism being described the drive plate 116 has a drive pin 118 which meshes in drive slots 119 being held in proper position by the lock ring 120 as engaged by the lock segment section 121 on the driven member 117. It will be obvious that when the member 116 revolves one revolution, the driven member 117 is driven one-quarter revolution, and during all this period the member 117 is either locked in a definite position or is quickly rotating one-quarter of a revolution. The adaptation of this arrangement will be later disclosed in connection with a four-outlet valve.

Now referring to Figs. 8 and 12, it will be seen that the driven plate 117 is feather keyed on a shaft 122 slidable on a keyway 169, which actually is a valve stem shaft extending through a valve cover-plate 123 and attached to a conical valve plug 128. The valve cover-plate 123 not only serves as a cover-plate, but also as a mounting bracket for the solenoid 115 and a journal bracket for the shaft 104. It also has a conventional valve shaft packing gland 123' which seals the extended portion of the shaft 122 from the interior of the valve body 125. The valve plug 128 is urged downward into sealed contact with the valve body 125 by a compression spring 124, as shown. It will be noted that the valve seat plug 128 has a partition 128' dividing the valve into two separate divisions. In the upper division there is a single valve seat discharge opening 129 which indexes with four discharge pipe line openings 131, 133, 135 and 137. The lower section of the valve has an inlet opening 130 which indexes with four inlet pipe lines 132, 134, 136 and 138.

The valve shaft 122 is feather keyed to the valve plug 128 by a keyway 170 and pinned to a drain plug 171 having a matched opening 130' with the inlet opening 130 of the valve plug 128. It will be apparent that when the shaft 122 is depressed against the compression spring 172, the drain plug 171 will be forced away from seal contact with the valve plug 128 and thereby open all four inlet pipe lines 132, 134, 136 and 138, permitting them all to drain simultaneously through the manifold 140. Thus valve means is provided to drain the entire machine as will later be explained.

It will be noted that the valve body 125 has integral with it a pump casing 126 and an inlet manifold tube 140. Thus water received through the opening 130 is taken through the outlet pipe 142 which is a circulator discharge tube, as will later be identified.

Attached to the pump casing 126 is a similar pump casing 127 which houses the pump rotor 97. This pump is served through a single inlet tube 139, which will later be identified as the receiver casing sump outlet pipe. Thus water from the receiver casing is taken through the pump 97 and discharged through the outlet manifold tube 141 and into the top section of the valve 125 and through the discharge opening 129 to any one of four outlet pipes 131, 133, 135 and 137.

By referring to Fig. 26, in which the arrangement is shown diagrammatically, it will be clearly shown that pump 97 has an inlet pipe 139 from the tub casing sump 45' and the pump discharges water through either of four pipe lines, namely 131 to the first wash tank 33, 133 to the second wash tank 34, 135 to the first rinse tank 35, and 137 to the second rinse tank 36. Also it will be clearly shown and understood that the pump 98 has four inlet pipe lines, namely 132 from the first wash tank 33, 134 from the second wash tank 34, 136 from the first rinse tank 35, and 138 from the second rinse tank 36. The pump 98 is discharged through the circulator discharge tube 142 and out the nozzle 143 into the tub 32.

In the circulator tube 142 is inserted a solenoid check valve 144, as shown in Fig. 2. By means of this check valve the discharge of water from the pump is stopped by energizing the solenoid.

Now referring to Figs. 4, 8, 11 and 26, and continuing the explanation of how the machine is drained, it has been explained how depressing the shaft 122 and the drain plug 171 opens up the four inlet pipe lines 132, 134, 136 and 138 to the manifold 140 and thus permits complete draining of the machine.

In Fig. 11 is shown how this shaft 122 may be depressed. A foot lever 173 pivoted at 174 has a foot pad 175 extending beyond the lower edge of the cabinet 31, as clearly shown in Fig. 1. When this foot lever is depressed, it is held by a catch latch 176 catching under the lower edge of the cabinet, being actuated by the tension spring 177 and can be released by merely pushing the latch 176 inward with the toe. The pressure end of the lever 178 abuts the shaft 122 and obviously will depress it when the operator steps on the foot lever, thus opening up the inlet pipes for draining.

On the pressure end of the lever 178 is a leaf spring 180 pivoted on a bracket 181 and bearing against a pin 179. This leaf spring contacts the trip pin 183 of a quick action or microswitch 182 on the bracket 181. Thus, when the lever 173 is operated to drain the machine the micro-switch closes the circuit to the pump motor 94 and assures that the pump will operate for the draining operation.

As shown diagrammatically in Fig. 26, this draining is accomplished by merely attaching a drain hose 183 to the nozzle 143. Also, as shown in Figs. 4 and 26, a manually operable drain 145 is provided, and this drain at the lowest point in the pipe system assures complete draining of the machine.

Now referring to Fig. 18 in which is shown the control apparatus, a small fractional horsepower motor 146 drives a shaft 148 through a conventional speed reducer 147.

Keyed to this shaft 148 by the coupling 149 is a controller shaft 150 which has a series of control cams 17', 20', 21', 22', 23', 24' and 25', also keyed to the shaft and held in spaced relationship by the jam nut 151 and the spacer washers 152. These control cams correspond with Figs. 17, 20, 21, 22, 23, 24 and 25, which are plainly marked for the circuits and apparatus they control (the circuits being marked the primed numerals of the apparatus).

Now referring to the above figures, it will be noted that these control disks are conventional cam structures wherein a series of notches or lugs are made to contact with a spring arm on which is carried an electrical contact point which matches with a similar contact point on a stationary arm. Thus referring to Fig. 23, the stationary arm 161, with its contact point 163, has broken contact with the point 164 on the spring arm 162 because the cam disk at this point has permitted the spring arm 162 to spring downward, thus breaking the contact. It is obvious that when the cam under the spring arm 162 rotates clockwise the contact points 163 and 164 will be closed and the circuit 115' "made."

Figure 20:
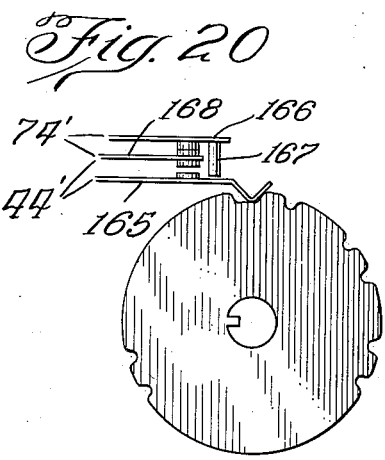
Figure 21:
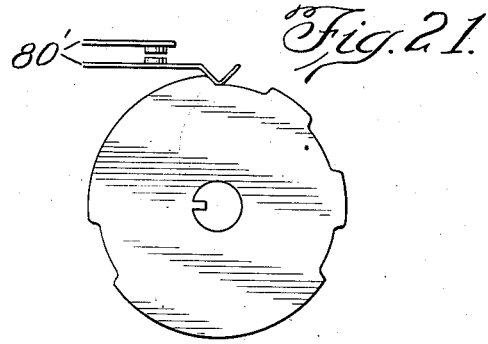
Figure 22:
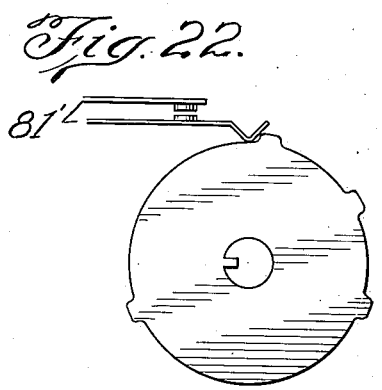
Figure 23:
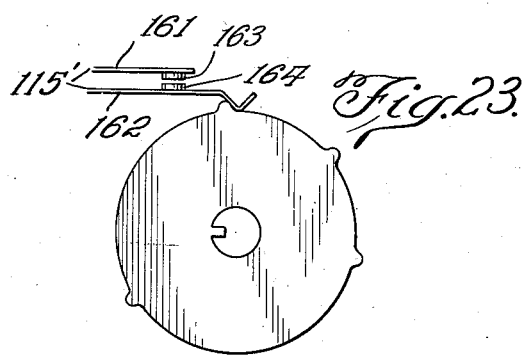
Figure 25:
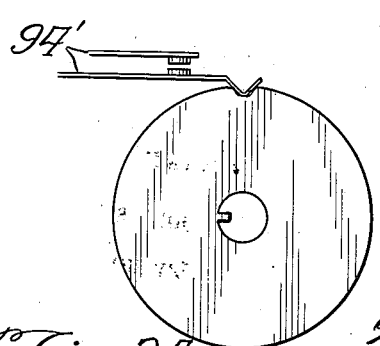
Figure 24:
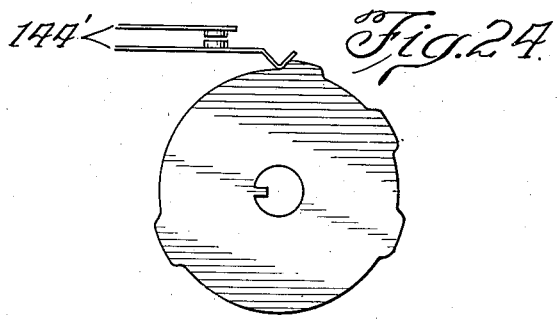

In some cases a cam disk is made to handle more than one electric circuit, as is illustrated in Fig. 20. Here the spring arms are 165 and 166 working in harmony by the connector member 167 and the stationary arm with double contact points is 168 positioned between the spring arms 165 and 166. This method of controlling electrical circuits by cams of this character is well known and applicant does not feel that a detailed description of each of the cams as illustrated is either necessary or advisable. In each of the cam disks illustrated the electrical circuit or the apparatus it controls has been plainly marked and to anyone skilled in the art, by referring to the diagrammatic outline in Fig. 26, the manner and means of controlling the circuit will be well understood. Applicant again desires to point out that the cam disks illustrated under the figure numbers are referred to by the same number primed as numerals in Figs. 18 and 26.

Now referring to Fig. 17 wherein the control disc 17' controls the motor 146 through the circuit 146', it will be obvious that the contact points are open and the motor stopped. In order to start this control motor 146 and the cycle of washing operations, it is necessary to provide a manual starting means and this is done by the starter button 157 through the circuit 157', as shown in Figs. 1 and 26. This requires only a momentary impulse from the motor and thereafter the control motor carries out its complete cycle of operations.

Mounted above the controller housing on the top of the cabinet, as shown in Figs. 18 and 19, is a control dial 154 with knob 154'. This dial is connected to a rheostat 155 by a shaft 156, the rheostat being connected in the motor circuit 146' of the control motor 146. The dial is marked in numerals 20 to 34 representing the time in minutes for the complete washing cycle. Thus, by adjusting the dial 154 and the rheostat 155, the operator controls the speed of the motor 146 and the time of washing to suit the nature of the wash.

In Fig. 26 is illustrated diagrammatically a main control switch 158 (otherwise not shown) whereby the main electrical circuit to the washer may be disconnected.

It is believed that the foregoing description will clearly and completely disclose the structure of the machine whereby the complete cycle of washing, rinsing and drying is done automatically. This sequence of operations will now be explained in detail.

Sequence of operations

1. Start machine by depressing starter button 157.
2. Pump water from first wash tank 33 into tub 32 and from receiver casing 45 back into tank 33. Start tub on oscillating washing motion. Run seven minutes.
3. Tub stops. Water stops from water tank 33 to tub by check valve 144. Continue pumping from receiver casing to tank 33.
4. Tub starts on extractor spinning action. Runs one minute.
5. Stop extractor spinning of tub by stopping motor 44 and applying brake 52 by solenoid 74.
6. Pump water from second wash tank 34 into tub and from receiver casing 45 back into tank 34. Start tub on oscillating washing action. Run ten minutes.
7. Tub 34 stops. Water stops from second wash tank 34 into tub by check valve 144. Continue pumping from receiver casing back into tank 34.
8. Tub starts on extractor spinning action. Runs one minute.
9. Stop spinning tub by stopping motor 44 and applying brake 52.
10. Pump water from first rinse tank 35 into tub and from receiver casing back into tank 35. Start tub on oscillating rinsing action. Run three minutes.
11. Tub stops. Water stops from first rinse tank 35 to container by check valve 144. Continue pumping from receiver casing back into tank 35.
12. Start tub on extractor spinning action. Run one minute.
13. Stop spinning extractor action of tub by stopping motor 44 and applying brake 52.
14. Pump water from second rinse tank 36 into tub and pump from receiver casing back into tank 36. Start tub on oscillating rinsing action. Run three minutes.
15. Tub stops. Water stops from second rinse tank 36 to container by check valve 144. Continue pumping from receiver casing into tank 36.
16. Start tub on extractor spinning action. Run one minute.
17. Stop spinning of tub by stopping motor 44 and applying brake 52. Total time, including stopping apparatus, controllable through control dial 154 and knob 154' from 20 to 34 minutes.

With the foregoing explanation the structure and operation of the machine will be fully understood. Applicant now desires to explain and point out that by the means as described the following definite results are accomplished:

*a*. Effective washing of clothes is accomplished by the oscillatory movement of the vertical axis tub with baffles or other washing means therein.

b. Unusually effective wringing results are accomplished by the high rotational speed developed by the tub during the extraction cycle. The wringing results thus accomplished are far in advance of the usual results in domestic washing machines. Drying time is cut down very materially because of the effective wringing results thus accomplished.

c. The circulation of a large volume of both wash and rinse water during the two-power washing and two-power rinsing operations is a definite advance over conventional washing methods.

d. No waste of water, soap, bluing or heat. The optimum in economical arrangement.

e. The machine requires no expensive plumbing or in fact any unusual installation expense.

f. No large hot water supply requirements are necessary in the operation of this machine.

g. The operation of the machine is very smooth and quiet. Vibration almost entirely eliminated because of the unique resilient support of the small tub with minimum chances for vibration and the fact that the entire machine when filled with water in the supply tanks is sufficiently heavy to absorb practically all vibration.

h. The time of the complete washing cycle is very fast, this being accomplished by the unusually effective washing and wringing methods and the fact that there is no lost time during any of the cycle of operations in the machine.

i. The machine definitely is sanitary. Every part of the machine which comes in contact with the wash or rinse water may be hand-scrubbed.

As stated at the outset, the structure and principle of operation of the machine is susceptible to various modifications and the applicant does not desire to be limited in any way except as imposed by the following claims.

I claim:

1. A self-contained laundry apparatus, comprising a small tub adapted to receive clothes but lacking capacity for sufficient washing fluid to wash the clothes, means in the tub rotatable therewith for agitating the contents thereof, mechanism to effect oscillation of said agitating means, a tank having a capacity many times that of the tub adapted to contain the complete washing supply of cleansing liquid, and means for forcing substantially continuous rapid circulation of the cleansing liquid in a course from the tank to the tub and from the latter back into the tank during the operation of the agitating means, whereby a batch of clothes in the tub may be subjected to a volume of changing liquid many times greater than the capacity of the tub during the period of operation of the agitating means.

2. A self-contained laundry apparatus comprising a small rotatable tub adapted to receive clothes but lacking capacity for sufficient washing fluid to wash the clothes, means in the tub rotatable therewith for agitating the contents of the tub, mechanism to effect oscillation or rapid rotation of the tub and its agitating means, a tank having a capacity many times that of the tub adapted to contain the complete washing supply of cleansing liquid, a pump for forcing the liquid from said tank to the tub during the oscillatory phase of the movement of the tub, a second pump for drawing the liquid escaping from the tub away therefrom and back to said tank whereby rapid circulation of the cleansing liquid in a course from and back to the tank is effected during the said oscillating phase of the movement of the tub, and instrumentalities for stopping the supply of liquid to the tub during the rapidly rotating phase of its movement while the second-mentioned pump is drawing the liquid away from the tub and returning it to said tank, the tub being formed with a rim outlet to prevent excessive sudsing during the washing phase of the movement thereof.

3. Laundry apparatus comprising a cabinet structure, a clothes-treating unit centrally of said cabinet structure and having a part adapted to be rotated at high speed, separate compartments for liquids symmetrically disposed on opposite sides of said treating unit and spaced outwardly thereof from said rotatable part, means for gaining access to the respective compartments and clothes-treating unit at the top of the cabinet structure, and means for operating the clothes-treating unit while stabilized by the compartments and the contents thereof.

4. Laundry apparatus comprising a cabinet structure, a clothes-treating unit centrally of said cabinet structure and having a part adapted to be rotated at high speed, laterally spaced separate compartments for liquids symmetrically disposed on each of opposite sides of said treating unit and spaced outwardly thereof from said rotatable part, the compartments on each side of said treating unit being arranged on opposite sides of the rotatable part, means for gaining access to the respective compartments of the clothes-treating unit at the top of the cabinet structure, means for conveying the liquids from the respective compartments to the clothes-treating unit, and means for operating the clothes-treating unit while stabilized by the compartments and the contents thereof.

5. Laundry apparatus comprising a cabinet structure having a top, a clothes-treating receptacle centrally of said cabinet structure extending downwardly from the top thereof and having a part adapted to be rotated at high speed, laterally spaced separate compartments for liquids symmetrically disposed on each of opposite sides of said cabinet structure and spaced outwardly thereof from said receptacle, each of said compartments extending downwardly from the top appreciably below the receptacle, means for gaining access to the respective compartments and to the clothes-treating unit at the top of the cabinet structure, and means for operating the clothes-treating unit while stabilized by the compartments and the contents thereof.

HENRY W. ALTORFER.